US012082536B2

(12) United States Patent
Lundgren et al.

(10) Patent No.: US 12,082,536 B2
(45) Date of Patent: Sep. 10, 2024

(54) METHOD FOR MEASURING A TREE TRUNK, AND A HARVESTER

(71) Applicant: Komatsu Forest AB, Umeå (SE)

(72) Inventors: Karl Lundgren, Hörnefors (SE); David Rydberg, Umeå (SE)

(73) Assignee: Komatsu Forest AB, Umeå (SE)

( * ) Notice: Subject to any disclaimer, the term of this patent is extended or adjusted under 35 U.S.C. 154(b) by 909 days.

(21) Appl. No.: 17/056,693

(22) PCT Filed: Apr. 12, 2019

(86) PCT No.: PCT/SE2019/050340
§ 371 (c)(1),
(2) Date: Nov. 18, 2020

(87) PCT Pub. No.: WO2019/226088
PCT Pub. Date: Nov. 28, 2019

(65) Prior Publication Data

US 2021/0195856 A1 Jul. 1, 2021

(30) Foreign Application Priority Data

May 24, 2018 (SE) .................................. 1850617-0

(51) Int. Cl.
*A01G 23/08* (2006.01)
*A01D 57/01* (2006.01)
(Continued)

(52) U.S. Cl.
CPC ............ *A01G 23/08* (2013.01); *A01D 57/01* (2013.01); *A01D 69/03* (2013.01); *A01G 23/003* (2013.01);
(Continued)

(58) Field of Classification Search
CPC .... A01G 23/08; A01G 23/003; A01G 23/083; A01G 23/093; A01D 57/01; A01D 69/03;
(Continued)

(56) References Cited

U.S. PATENT DOCUMENTS

2004/0112463 A1* 6/2004 Hicks .................. A01G 23/081 144/34.1

FOREIGN PATENT DOCUMENTS

EP 2307849 4/2011
SE 518240 C2 9/2002
(Continued)

OTHER PUBLICATIONS

Notice of Allowance received for European Patent Application No. 19807497.3 mailed on Jul. 27, 2023, 8 pages.

*Primary Examiner* — Mohammed S. Alawadi
(74) *Attorney, Agent, or Firm* — Morrison & Foerster LLP

(57) ABSTRACT

A harvester that includes a harvester aggregate for felling, trimming and preparing tree trunks, a first measuring device provided in connection with the harvester aggregate for measuring of at least one dimension of a tree trunk. The harvester includes a second measuring device for measuring a feature of the first measuring device, whereby the feature is an attribute reflecting the capability of the first measuring device to measure the dimension correctly, and a control unit configured to make a comparison between an actual value of the measured feature and a target value of the feature, whereby the target value is indicative of a state of the first measuring device, where its measurement of the dimension is considered to be correct.

16 Claims, 5 Drawing Sheets

Figure 1:
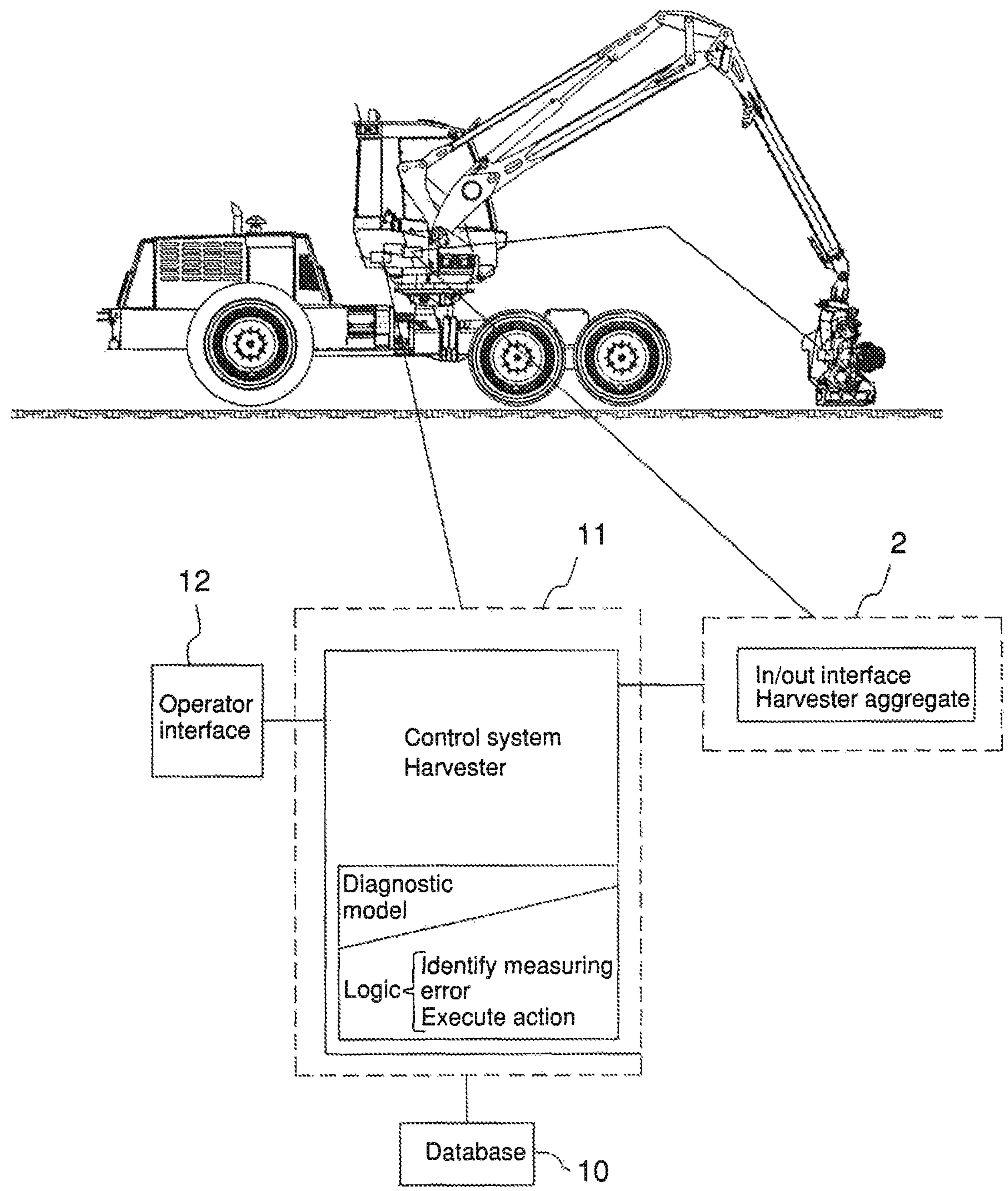

(51) Int. Cl.

| | |
|---|---|
| ***A01D 69/03*** | (2006.01) |
| ***A01G 23/00*** | (2006.01) |
| ***A01G 23/083*** | (2006.01) |
| ***A01G 23/093*** | (2006.01) |
| ***G01B 5/00*** | (2006.01) |
| ***G01B 5/02*** | (2006.01) |
| ***G01B 5/08*** | (2006.01) |
| ***G05B 15/02*** | (2006.01) |

(52) U.S. Cl.
CPC ............. *G01B 5/0035* (2013.01); *G01B 5/02* (2013.01); *G01B 5/08* (2013.01); *G05B 15/02* (2013.01)

(58) Field of Classification Search
CPC .......... G01B 5/0035; G01B 5/02; G01B 5/08; G05B 15/02
USPC ........................................................ 144/34.1
See application file for complete search history.

(56) References Cited

FOREIGN PATENT DOCUMENTS

| | | | | |
|---|---|---|---|---|
| WO | WO-0013485 | A1 * | 3/2000 | ........... A01G 23/097 |
| WO | WO-2000015026 | A1 | 3/2000 | |
| WO | WO-2002023973 | A1 | 3/2002 | |
| WO | WO-2006126952 | A2 | 11/2006 | |
| WO | WO-2010002339 | A1 | 1/2010 | |
| WO | WO-2013190179 | A1 | 12/2013 | |
| WO | WO-2015084186 | A2 * | 6/2015 | ........... A01G 23/083 |

* cited by examiner

METHOD FOR MEASURING A TREE TRUNK, AND A HARVESTER

CROSS REFERENCE TO RELATED APPLICATIONS

This application is a national stage application under 35 U.S.C. § 371 of International Application No. PCT/SE2019/050340, filed internationally on Apr. 12, 2019 which claims priority to SE 1850617-0, filed May 24, 2018, the disclosures of which are herein incorporated by reference in their entirety.

TECHNICAL FIELD

The present invention relates to a method for measuring of at least one dimension of a tree trunk by means of a first measuring device provided in connection with a harvester aggregate of a harvester, wherein the method comprises the following step:

measuring of said dimension by means of the first measuring device.

The invention also relates to a harvester, comprising a harvester aggregate for measuring, trimming and cutting up of tree trunks, and a first measuring device provided in connection with the harvester aggregate for measuring of at least one dimension of a tree trunk.

PRIOR ART

Harvesters for logging are equipped with a hydraulic crane, which in its tip carries a harvester aggregate of the so-called one-grip type, which is used for felling, trimming and preparing trees as tree trunks. Modern harvester aggregates contain measuring equipment for production measuring, which continuously measure the thickness or diameter of the tree trunk as well as how far the tree trunk in its longitudinal direction has been fed through the harvester aggregate. In the harvester aggregate, the diameter of the tree trunk is normally measured between three measuring points, either at the front or rear trimming grip of the harvester aggregate or between feed rolls adjustable in pairs, which from an idle mode can be guided towards the outside of the tree trunk so as to between them and a fixed abutment, which may be constituted by said central trimming knife or a separate central support roll in the aggregate, feed forward and guide the tree trunk to the trimming grip and further on through the harvester aggregate. Correspondingly, trimming knives, adjustable in pairs, which are contained in said respective trimming grip, from an idle mode can be guided forward towards the outside of the tree trunk, between them and a central fixed trimming knife, to trim the tree trunk, while it is guided through the aggregate. By means of attitude-sensing sensors, which are arranged onto said adjustable feed rolls or trimming knives, the diameter of the tree trunk can be measured while it is guided through the aggregate. The length of the tree trunk is usually measured by means of a length measuring wheel, which can roll along the outside of the tree trunk, while it is guided through the aggregate. Using these sensor values, a computer manages the adaptation and storage of desired measuring functions and data.

During work with the harvester aggregate, the length and diameter of the felled tree trunks are measured and registered, among other things to provide information about the log volume and hence timber produced. As mentioned above, measuring of the tree trunk length can be performed by way of a length measuring roll, which is in rolling contact with the outside of the tree trunk, while the tree trunk is guided through the aggregate. Knowing the measuring roll's outer diameter (the roll diameter of the measuring wheel) and how many revolutions it has rotated in connection with measuring, a measurement of the length of the measured tree trunk is obtained. The movement of hydraulically effective actuators and promoters, with which the trimming knives, effective in pairs, in said trimming grip or the feed rolls' position are in contact with the outside of the tree trunk can be converted into measuring data that represent the diameter of the tree trunk.

Due to wearing and external impact on the components by means of which length and diameter measuring of the tree trunks is performed, the measuring accuracy will decrease over time. To ensure avoidance of too extensive measuring errors, harvesters are normally provided with equipment that enables control and calibration of the measuring equipment of the aggregate. This equipment includes, among other things, a so-called measuring key, with which an operator can manually check measure the diameter of a tree trunk, and a tape measure or a similar linear gauge by means of which an operator can manually check measure the length of a tree trunk. To ensure the function of a harvester aggregate and thus that the length and diameter measuring works in the intended manner, an operator of a harvester should, at a pre-determined regularity, perform check measurement of a tree trunk's diameter and length. The result of such a check measurement is compared with a corresponding measurement executed by the first measuring device, and when an error exceeding a certain value is detected, a calibration of the first measuring device must be carried out to rectify the measuring error. The measurements executed with the first measuring device are registered in a memory that is included in a central control unit of the harvester. The result of a check measurement is compared with the measurement most recently performed by the first measuring device. This can be done by data from the check measurement being stored in the memory and with a processor in the control unit being compared with corresponding data from the measurement with the first measuring device. Entry of data from the first measuring device to the memory takes place automatically, and the entry of data from the check measurement can be done manually or automatically via an electronic unit in the measuring key.

The prior art technique has the disadvantage that it requires that an operator of a harvester to carry out check measurements at regular intervals without knowing whether the individual check measurement is really motivated by an actual measuring error by the first measuring device.

The object of the present invention is therefore to provide a method for measuring at least one dimension of a tree trunk by means of a first measuring device in connection with a harvester's harvester aggregate, reducing the need for a harvester operator having to perform check measurements at regular intervals and without knowing the measuring accuracy of the first measuring device to ensure the measuring accuracy of the first measuring device.

An object of the present invention is also to provide a harvester that allows for implementation of the method according to the invention.

SUMMARY

The object of the invention is met by means of the initially defined method, characterized in that it includes a diagnostic model, which comprises the following steps measuring of a feature of the first measuring device by means of a second measuring device, whereby said feature is an attribute that reflects the capability of the first measuring device to measure said dimension correctly, comparison between an actual value of the measured feature and a target value of said feature, whereby the target value is indicative of a state of the first measuring device, where its measurement of said dimension is considered to be correct, and, in response to the actual value deviating from the target value by more than a pre-determined difference, at least one of the following actions:

check measurement of said dimension with a third measuring device and calibration of the first measuring device based on the deviation between a measurement value of said dimension measured by means of the first measuring device and a measurement value of said dimension measured by means of the third measuring device, calibration of the first measuring device based on the size of the deviation between the measured actual value and said target value.

The second measuring device thus offers indirect information about the degree of correctness of the measurement with the first measuring device. According to an exemplary embodiment, an alarm to the operator of the harvester is generated in response to the deviation of the actual value from the target value by more than a pre-determined difference. Thus, the operator needs not perform check measurement except as reaction to such an alarm. According to an exemplary embodiment, the third measuring device includes means for manual measurement of said dimension, whereby the result of the check measurement is stored in a memory and compared with the result of the corresponding measurement with the first measuring device, suitably by a control unit with PC-based software suitable for this purpose in a computer with the harvester, and a calibration of the first measuring device is performed if the difference between the measurements with the first measuring device and the third measuring device exceeds a pre-determined value (difference). The calibration is suitably performed by the first measuring device with a control unit with software suitable for this purpose. Alternatively, if said difference exceeds another pre-determined value (difference), which is larger than the first-mentioned value determined, control, repair or exchange of the component of the first measuring device causing the measuring error of the first measuring device takes place.

Alternatively, in response to the actual value deviating from the target value by more than a pre-determined difference, a calibration is performed of the first measuring device, based on the size of the deviation between the measured actual value and said target value. This calibration is suitably performed by a control unit with software suitable for this purpose. To enable as exact a calibration as possible as regards the size of the deviation between the measured actual value and said target value, a plurality of measurements are collected over time from the first measuring device, corresponding measurements from the second measuring device and corresponding measurements from the third measuring device, and these are compared to provide an accurate correlation between the measuring accuracy of the first measuring device (comparison of measurements with the first and the third measuring devices) and the difference between the actual value and the target value. According to an exemplary embodiment, such measuring data can be collected and saved from a plurality of various harvesters, whereby the control unit can be given access to such additional measuring data so as to refine the correlation.

The term "feature" as used in this context is used in a broad sense and implies a variable parameter of any part constituent in the harvester, which can be considered to constitute part of the first measuring device. The feature is an "attribute", which for the purpose is indicative of whether the first measuring device gives measuring errors. It should be understood that the feature can also be an "attribute", which is indicative of the size of a measuring error of the first measuring device.

According to an exemplary embodiment, the method according to the invention is characterized by measuring of said dimension with the first measuring device including dimension measuring with at least one of the following components:

adjustable wood processing means (feed rolls effective in pairs or cutting blades for trimming) with the purpose of guiding a tree trunk through a harvester aggregate, a length measuring wheel, intended to be caused to roll towards the outside of a tree trunk that is guided through a harvester aggregate, Length measurement of a tree trunk is suitably made by the rotation of a feed roll or a passive measuring wheel being registered by means of a sensor that registers rotation while the tree trunk is guided through the harvester aggregate. Based on the external diameter and rotation of the measuring roll or the measuring wheel, the tree trunk length can be calculated. The sensor provides pulses depending on the rotation to a processor in a control unit, and x pulses are converted by it to y length units according to a basic setting. According to an exemplary embodiment, the basic setting is not changed in connection with calibration, but an offset value is added to/subtracted from the calculated length. Measurement of a tree trunk diameter is based on the rotation of a shaft, on which an adjustable wood processing means in the form of cutting blades for trimming, effective in pairs, included in a trimming grip or feed rolls, effective in pairs, included in a measuring unit, are arranged from an initial position to be guided forward to a position in which some of said components are caused to interact with the outside of the tree trunk. In all instances mentioned, it is thus a position sensor, here exemplified by a rotation or an angle sensor, which is used for calculating the length and diameter of the tree trunk.

According to an exemplary embodiment, the method is characterized by the wood processing means with which said dimension is measured, being a component that through the effect of hydraulic flow, is caused to swing about a shaft in connection with the component being caused to interact or get into contact with the outside of the tree trunk in such a manner that the size of the pivotal movement can be translated to said dimension, whereby the size of the swing is measured with the first device and the feature that is measured with the second measuring device is an attribute in the form of the pressure of the hydraulic fluid that drives said pivotal movement of the component.

According to an alternative embodiment, the feature that is measured with the second measuring device is an attribute in the form of a position or a movement of the component that forms part of the first measuring device and which, through a movement, is caused to interact or get into contact with the outside of the tree trunk.

According to a further exemplary embodiment, the method is characterized by the fact that in response to the actual value deviating from the target value by more than a pre-determined difference, it comprises check measurement of said dimension with a third measuring device and that the deviation between the actual value and the target value is compared with the deviation between a measurement value of said dimension obtained by the first measuring device and a measurement value of said dimension obtained by the third measuring device, and that the comparison is saved in a working memory in a control unit. Thus, preconditions are established for a refining of the method, involving that a given deviation between the actual value and the target value can be used, not only for ascertaining the existence of error in the measuring accuracy of the first measuring device, but also to provide a forecast of the size of the error as to the divergence (difference) between the actual value and the target value in the individual instances.

According to an exemplary embodiment, the method is characterized by the fact that dimension, which is measured by the first measuring device, is the length of the tree trunk and that the measurement of the length is made by registering the rotation of the wood processing means, which in this case is constituted by feed rolls, effective in pairs, to guide a tree trunk through the harvester aggregate, and that the feature that is measured at the first measuring device with the second measuring device is an attribute in the form of the pressure of a hydraulic fluid, which drives a hydraulic cylinder with which the respective feed rolls' position relative to the tree trunk is controlled. Based on the external circumference of the feed roll and the size of the rotation of the feed cylinder, the length of the tree trunk is calculated. With the hydraulic cylinder the feed roll is pressed against the tree trunk. Through friction engagement with the tree trunk, a rotary power by an engine drives the feed roll to guide the trunk through the harvester aggregate while the feed roll rotates. If the actual value of the hydraulic fluid deviates from a target value by a pre-determined difference in the second measuring device, this could indicate that the measuring that is performed with the first measuring device is not correct and that check measurement with a third measuring device, whose functionality is independent of the functionality of the first measuring device, should be performed.

According to an exemplary embodiment, the method is characterized by the fact that the dimension, which is measured by the first measuring device is the length of the tree trunk and that the measurement of the tree trunk length is made by registering the rotation of a length measuring wheel, arranged to bear against and be caused to roll by the tree trunk, while it is guided through the harvester aggregate, and that the feature that is measured at the first measuring device with the second measuring device is the pressure of a hydraulic fluid, which drives a hydraulic cylinder with which the position of the length measuring wheel is controlled. The hydraulic cylinder applies a force that presses the length measuring wheel to abutment on the tree trunk. Based on the outside scale of the length measuring wheel and the size of the registered rotation, the length of the tree trunk is calculated.

According to an exemplary embodiment, the method is characterized by the dimension, which is measured with the first measuring device being the diameter (thickness) of the tree trunk and by this measurement being performed by some of the wood processing means, which in conjunction with the outside of the tree trunk guide the tree trunk through the aggregate, and the attribute that is measured at the first measuring device with the second measuring device is the pressure of a hydraulic fluid that drives a hydraulic cylinder with which the position of the wood processing means relative to the tree trunk can be controlled and checked. Wood processing means are according to an exemplary embodiment a pair of trimming knives, which are sustained in arms included in the aggregate are pivotable relative to the outside of the tree trunk occupied in the aggregate. According to another exemplary embodiment, wood processing means are constituted by a pair of feed rolls, which on arms included in the aggregate, are pivotable relative to the outside of the tree trunk sustained in the aggregate.

The object of the invention is also met by means of the initially mentioned harvester, which is characterized by comprising

- a second measuring device for measuring a feature of the first measuring device, whereby said feature is an attribute that reflects the capability of the first measuring device to measure said dimension correctly, and
- a control unit configured to make a comparison between an actual value of the measured feature and a target value of said feature, whereby the target value is indicative of a state of the first measuring device, where its measurement of said dimension is considered to be correct.

According to an exemplary embodiment, the harvester aggregate comprises at least one of the following components:

- adjustable wood processing means (feed rolls or cutting blades for trimming effective in pairs) with the purpose of guiding a tree trunk through a harvester aggregate,
  - a length measuring wheel intended to be caused to roll against the outside of a tree trunk that is guided through a harvester aggregate, and forms at least one of these components as part of the first measuring device.

According to an exemplary embodiment, the wood processing means with which said dimension is measured, is a component that, through the effect of hydraulic fluid, is caused to rotate about a shaft in connection with the component interacting with the outside of the tree trunk, wherein the first measuring device comprises a sensor for measuring the component's rotation about said shaft and the second measuring device comprises a sensor arranged to measure an attribute in the form of the pressure of the hydraulic fluid that drives said pivotal movement of the component.

According to an exemplary embodiment, the harvester is characterized by it comprising a feed roll to guide a tree trunk through the harvester aggregate, by the first measuring device comprising means included in said feed roll for registering the rotation of the feed roll while it guides a tree trunk through the harvester aggregate and means for calculating the length of the tree trunk based on the registered rotation and by the attribute that is measured at the first measuring device with the second measuring device is a pressure of a hydraulic fluid in a hydraulic cylinder, which is provided to apply a compressive force on the feed roll against a tree trunk occupied in the harvester aggregate and by the second measuring device comprising a pressure sensor for measuring said pressure.

According to an exemplary embodiment, the harvester is characterized by it comprising a length measuring roll, arranged to bear against and roll against the tree trunk, while it is guided through the harvester aggregate, by the first measuring device comprising said length measuring roll, means for registering the rotation of the measuring roll and means for calculating the length of the tree trunk based on the registered rotation and by the feature that is measured by the length measuring roll with the second measuring device is an attribute in the form of a pressure of a hydraulic fluid in a hydraulic cylinder, which is provided to apply a compressive force on the length measuring roll against a tree trunk guided through the harvester aggregate and by the second measuring device comprising a pressure sensor for measuring said pressure.

The object of the invention is moreover obtained by a personal computer-based computer program (PC) for control of a device, comprising instructions, which, when executed in the personal computer's central processing unit (CPU), cause said PC to execute the method according to the present invention.

The invention also comprises a computer-readable storage medium, which holds a computer program such as the one defined in the previous section for controlling a device.

The device that is controlled by said PC is preferably a measuring device of a harvester according to the invention, preferably the first and the second measuring device as defined above.

Further characteristics of and advantages of the invention appear from the following detailed description of exemplary embodiments.

SHORT DESCRIPTION OF THE DRAWING

Figure 2:
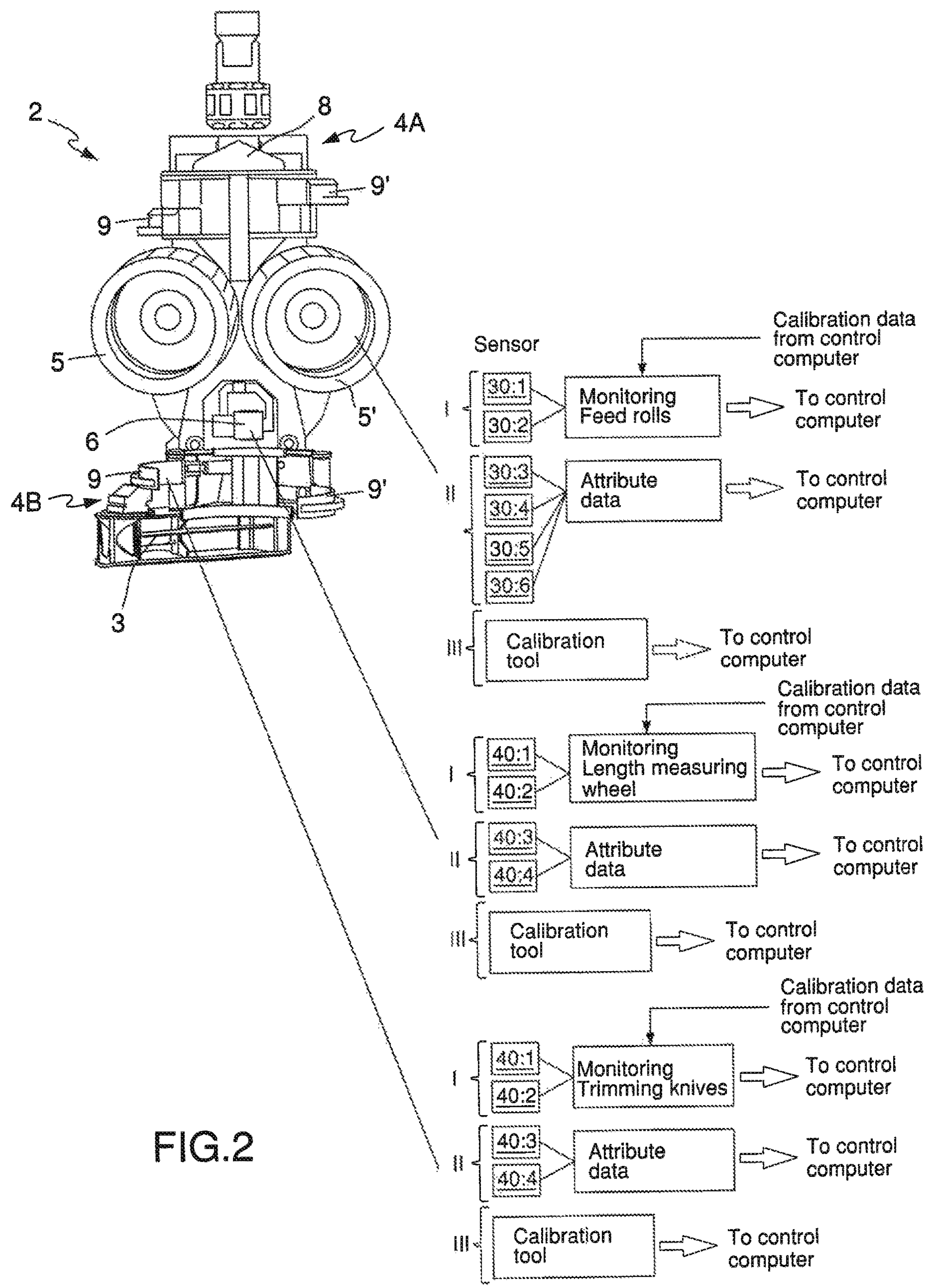
Figure 3:
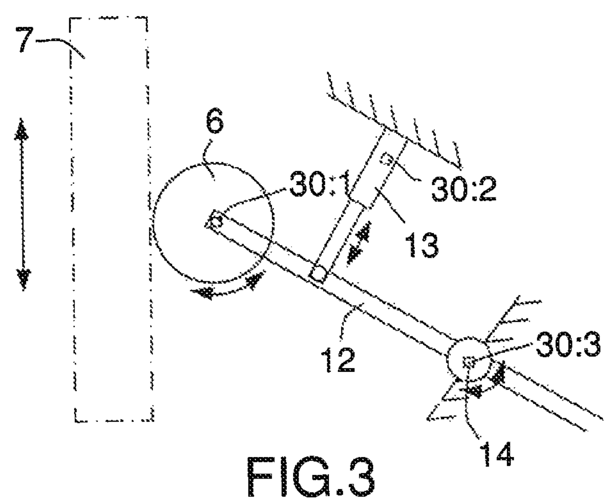
Figure 4:
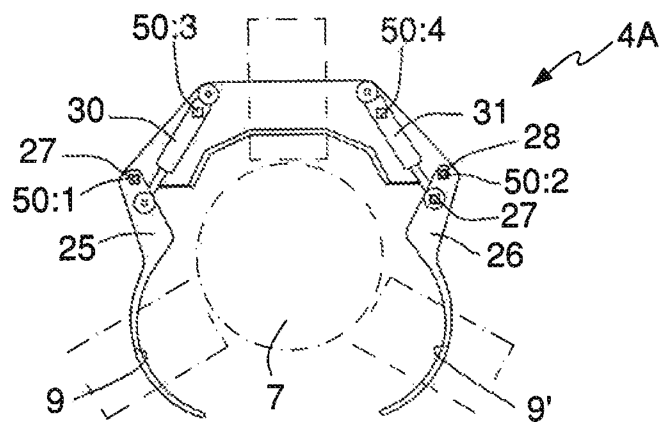
Figure 5:
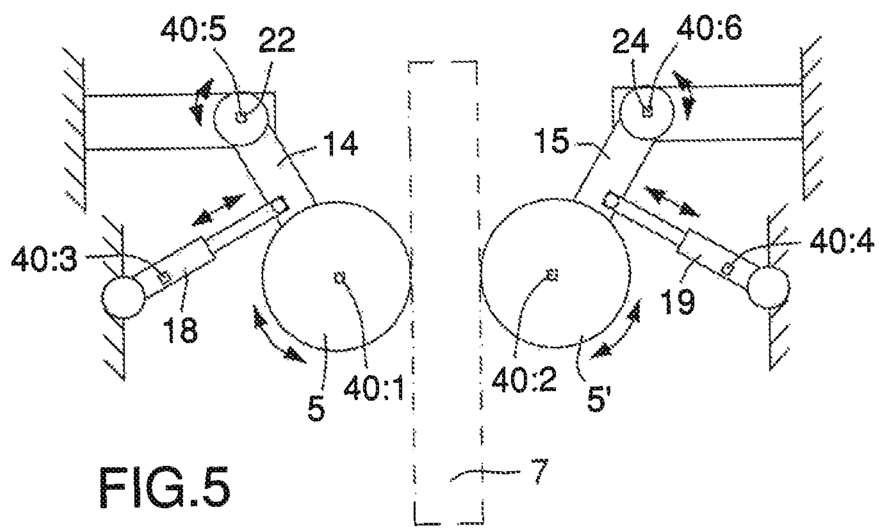
Figure 6:
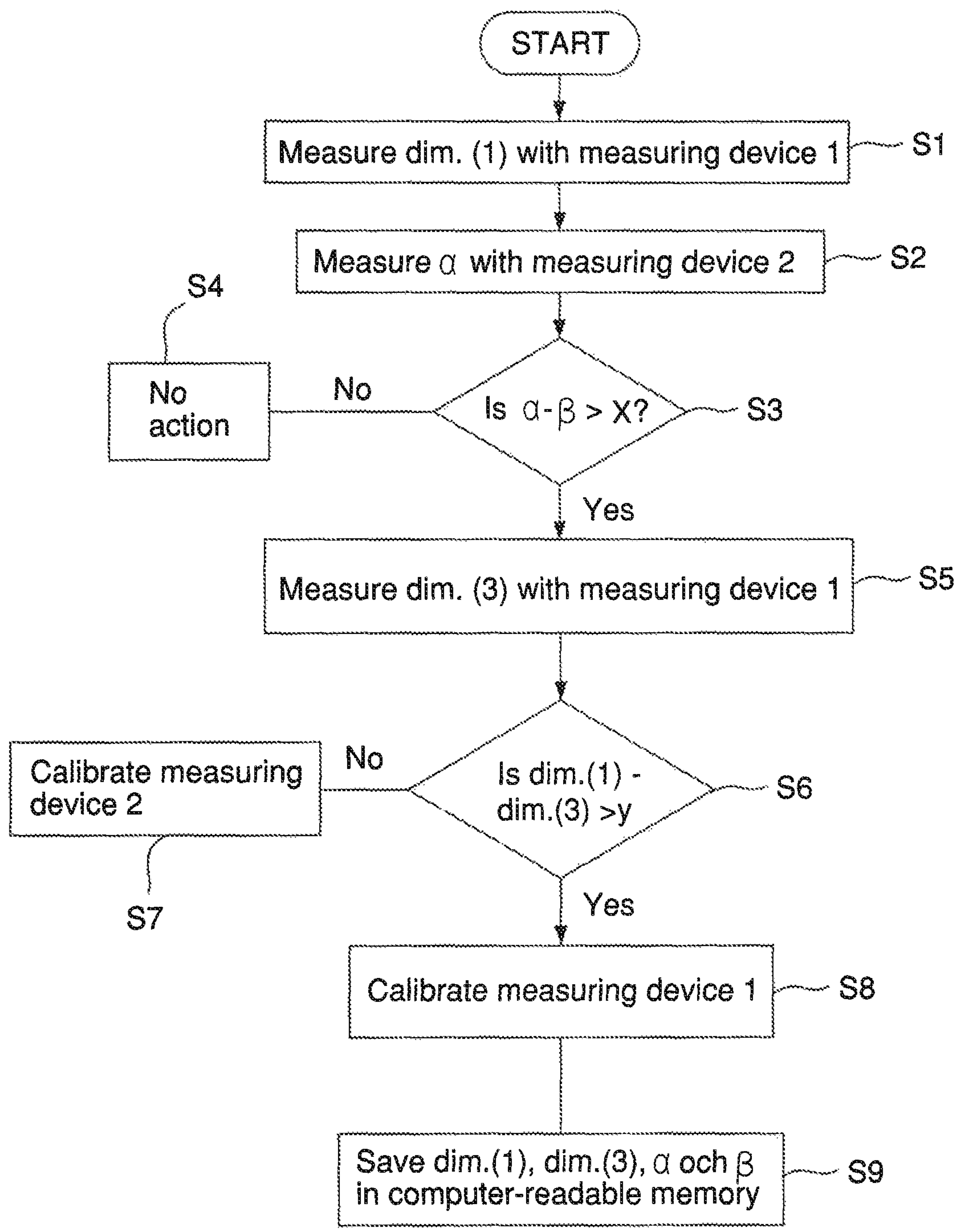
Figure 7:
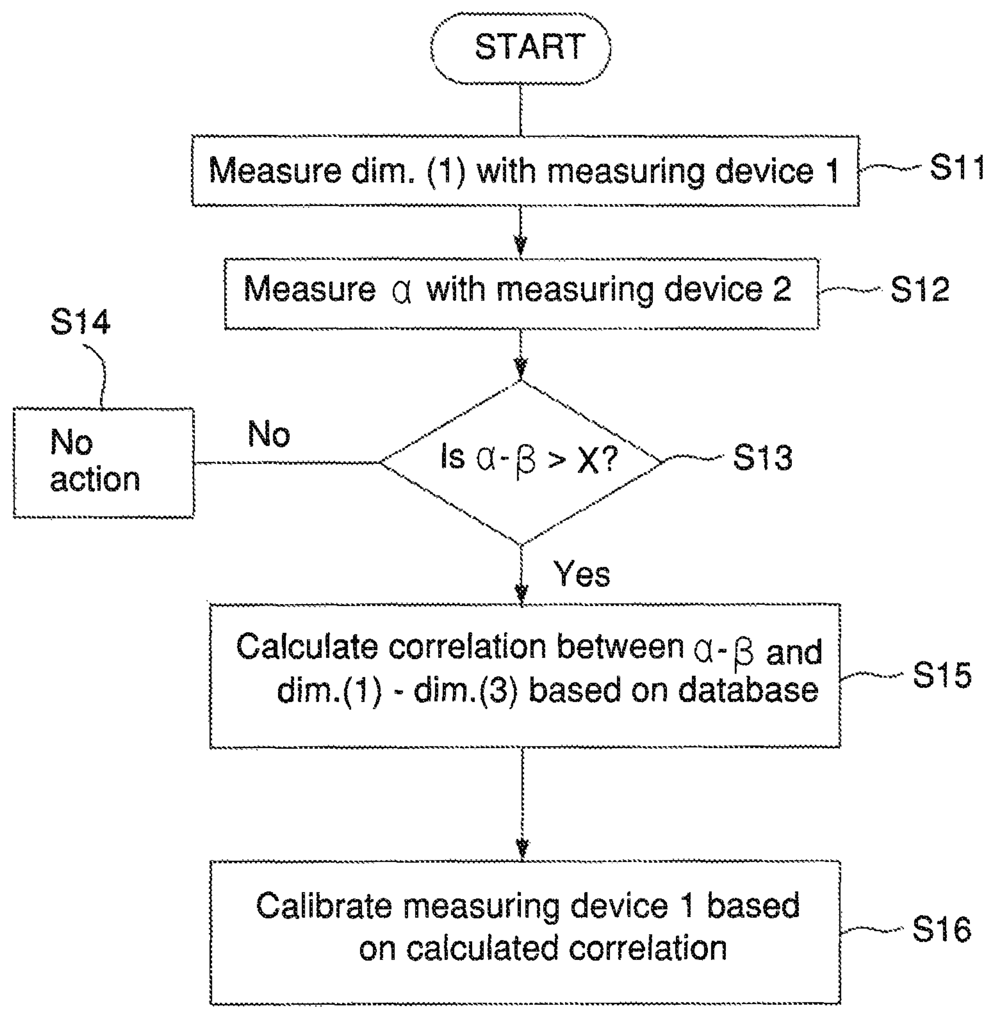

Exemplary embodiments of the invention are hereinafter described in an exemplary object with reference to the accompanying drawing, on which:

FIG. 1 shows a side view of a harvester according to the invention,

FIG. 2 shows a view from the front of a harvester aggregate sustained by a harvester equipped with a measuring and calibration device according to the invention, FIG. 3 schematically shows a first measuring device (I) and a second measuring device (II) according to a first exemplary embodiment, FIG. 4 schematically shows a first and a second measuring device according to a second exemplary embodiment, FIG. 5 schematically shows a first and a second measuring device according to a third exemplary embodiment, FIGS. 6 and 7 show a flow chart, describing an exemplary embodiment according to the present invention.

DETAILED DESCRIPTION

FIG. 1 shows a harvester 1 according to an exemplary embodiment of the invention, comprising a harvester aggregate 2 of the so-called one-grip type, which is used for felling, trimming and preparing (cutting) trees on roots into tree trunks and finally to categorize logs (timber) into sizes. FIG. 2 shows the harvester aggregate 2 in more detail. The harvester aggregate 2 comprises a cut-off saw 3 for cutting of a tree trunk processed into logs by the aggregate. In FIGS. 2, 4A, 4B denote a front respectively a rear trimming grip, 5, 5' feed rolls effective in pairs to guide a tree trunk through the harvester aggregate 2. A length measuring wheel 6 is arranged to bear against the tree trunk 7 and be caused to roll by the tree trunk when it is guided through the harvester aggregate 2 by the feed rolls 5, 5'. In each of said trimming grips 4A, 4B, a central fixed cutting blade 8 as well as a pair of pivotally movable trimming knives 9, 9' are included on arms, which together with the feed rolls 5, 5' can guide the tree trunk through the harvester aggregate 2.

Feed rolls 5, 5' and the length measuring wheel 6 together form part of a first measuring device, denoted "I" in FIG. 2, with which the diameter respectively the length of a tree trunk can be measured when it is guided through the harvester aggregate. Dimension data can be collected in a computer-readable non-volatile storage medium, such as a database 10 to provide information about the volume of tree trunks produced. The first measuring device further comprises a control unit, denoted 11 in FIG. 1, which comprises a CPU or the like that receives measuring signals from sensing elements and sensors 30:1-30:*n*, 40:1-40*n*, 50:1-50:*n* arranged at said feed rolls 5, 5' and the length measuring wheel 6, whereby said CPU is arranged to calculate the dimension of the tree trunk and hence each produced log based on these measuring signals. An operator of the harvester 1 can communicate with the control computer 11 via a traditional operator interface 12, which can e.g. comprise a monitor inside the driver's cabin 1 (not shown). To control that the measurement that is performed with the first measuring device is correct, the harvester 1 comprises a second measuring device, denoted "II" in FIG. 2, comprising means for measuring a feature in the form of an attribute of the first measuring device and which attribute data can offer information about the correctness of the first measuring device and whether control by means of a third measuring device, denoted "III" in FIG. 2, needs to be performed. It should be understood that said third measuring device is of the type that can perform measuring independently of the first measuring device. Said second measuring device is described in more detail in connection with the following description of the components of the first measuring device.

According to a first exemplary embodiment, the first measuring device (I) comprises a length measuring wheel 6 for measuring the length of a tree trunk that is guided through the harvester aggregate 2. With reference to FIG. 3, it is schematically shown how the length measuring wheel can be arranged to perform its measuring. In FIGS. 3-5, a tree trunk has reference numeral 7.

As illustrated in FIG. 3, the length measuring wheel 6 is stored on a pivotable arm 12. The first measuring device comprises means in the form of rotation sensor 30:1 to register the rotation of the length measuring wheel 6. The control unit 11 is arranged to calculate the tree trunk length based on the rotation registered by the rotation sensor 30:1 and based on data about the external diameter of the measuring wheel 6. A hydraulic cylinder 13 is arranged to swing the arm 12 about a shaft 14 and thus guide the length measuring wheel 6 to abutting engagement against the tree trunk 7. The hydraulic cylinder 13 and the hydraulic fluid that drives it can be considered to constitute a part of the first measuring device. The second measuring device (II) here comprises a sensor 30:2 for measurement of an attribute denoted $\alpha$ in the form of the pressure of said hydraulic fluid. Based on an established relationship between the abutment pressure for the length measuring wheel 6 and the pressure of the hydraulic fluid, it can in an interval x for a target value denoted $\beta$ of the hydraulic fluid pressure be determined, within which the length measuring wheel abutment and hence measuring accuracy is considered to be correct. In measuring with the second measuring device's pressure sensor 30:2, an attribute is obtained in the form of an actual value, which in the control unit 11 is compared with said target value. When the actual value $\alpha$ deviates from the target value $\beta$ by a pre-determined difference, which could be outside the interval x mentioned above that suitably could be a suitable selected functional magnitude or graph (not shown), the control unit 11 is arranged to initiate or give an operator of the harvester 1 an indication via operator interface 12 that he or she should perform a check measurement of the current dimension with the third measuring device mentioned previously.

As illustrated in FIG. 2, the result of the measurement with the third measuring device (III) is transferred to the control unit 11, either automatically with suitable electronic transmission means or manually by the operator manually entering the values in the control unit 11 via a user interface. The control unit 11 is arranged to initiate a calibration of the first measuring device based on the deviation between a measurement value α for said dimension measured with the first measuring device and a measurement value γ for said dimension measured with the third measuring device. Alternatively, the control unit 11 can be arranged to perform a calibration of the first measuring device, based on the size of the deviation between the measured actual value and said target value β. This will be possible, when the fundamental data for the correlation between the size of the deviation between the measured actual value α and the target value β and the measuring accuracy of the first measuring device is sufficiently large. Therefore, data are continuously collected from all measurements with the first, second and third measuring devices in a computer-readable storage medium 10 and the control unit comprises a processor with a diagnostic model provided to identify measuring errors out of these and calculate said correlation, so that automatic calibration of the first measuring device can be carried out as an alternative to the calibration that takes place as a result of control measurement with the third measuring device.

As an alternative or supplement to the pressure sensor 30:1, the second measuring device can comprise a position sensor 30:3, which senses an attribute in the form of the length measuring wheel's 6 position. According to the exemplary embodiment shown in FIG. 3, the position sensor 30:3 is a sensor, which senses the size of the swing of the arm 12 about said shaft 14. The principle of actual value α and target value β is also applicable here. For instance, the target value β can imply that the position sensor 30:3 must register a certain change of the swing of the arm 12 from measurement to measurement. If such a change is not registered by the position sensor 30:3, it may be a sign that the arm 12 has got stuck and that the length measuring wheel 6 in not in abutment against the tree trunk 7 as it should be. The control unit 11 is thereby suitably arranged to act as described above in the case of the pressure sensor 11 when its actual value α deviates with a pre-determined size from its target value β. In the case of the position sensor 30:3, it should be understood that automatic calibration based on the deviation x between the actual value α and the target value β is not feasible in the manner described above.

With reference to FIG. 5, as an alternative or supplement to measuring of a tree trunk 7 length with the length measuring wheel 6, the first measuring device can comprise an engine-driven feed roll 5, 5', i.e. the pair of feed rolls which between them can feed forward a tree trunk 7. FIG. 5 shows schematically how this part of the first measuring device can be arranged for measurement of the tree trunk 7 length. Each feed roll 5, 5' is stored on a pivotable arm 14, 15. The first measuring device here comprises a rotation sensor 40:1, 40:2 arranged to register the rotation of the feed cylinder 5, 5' about its rotation shaft. The rotation sensor 40:1, 40:2 can for instance be a pulse sensor of an engine that drives the feed cylinder 5, 5'. The control unit 11 is arranged to calculate the length of the tree trunk 7 based on the rotation registered by the rotation sensors 40:1, 40:2 and based on data about the external diameter of the feed roll 5, 5'. It is sufficient if one of the feed rolls 5, 5' has this functionality and is equipped with the rotation sensor 30:1, 30:2 described above, but as measurement on both feed cylinders is in principle possible, this is indicated in FIG. 5.

A hydraulic cylinder 18, 19 is arranged to swing said respective arm 14, 15 about a shaft 16, 17 and thus guide the feed rolls 5, 5' to engagement against the tree trunk 7. The hydraulic cylinder 18, 19, and the hydraulic fluid that drives it, can be considered to constitute a part of the first measuring device. The second measuring device here comprises a sensor 40:2, 40:4 for measurement of an attribute in the form of the pressure of said hydraulic fluid. Based on an established relationship between an abutment pressure α for the feed cylinder 5, 5' and the pressure on the hydraulic fluid, an interval x for a target value β of the hydraulic fluid pressure can be determined, within which the abutment and hence measuring accuracy of the feed cylinder 5, 5' is considered to be correct. In the same manner as described above for the length measuring wheel 6, the control unit 11 can be arranged to manage measuring data addressed from the first measuring device, the second measuring device and from the third measuring device according to the example with the measuring wheel 6.

In this part, it should be understood that each of said first and second measuring devices comprises electronically effective units, wherein each unit is integrated in the harvester aggregate 2 capable of communicating with the control computer 11 of the harvester via an interface I/O with data flow in suitable electronic buses.

As an alternative or supplement to the pressure sensors 40:3, 40:4, the second measuring device according to the exemplary embodiment of FIG. 5 can comprise a sensor 40:5, 40:6, which in the form of an attribute registers the swing of the arm 14, 15 about said shaft. The control unit 11 is suitably arranged to manage input from the sensor 40:5, 40:6, which registers the swing of the arm 14, 15 in the same way as described above for the exemplary embodiment with the length measuring wheel 6.

With reference to FIG. 4, as an alternative or supplement to the feed rolls 5, 5' for measuring of the tree trunk 7 diameter, the first measuring device can comprise trimming knives 9, 9' effective in pairs, which are included in said front respectively back trimming grip 4A, 4B, which trimming knives extended in a trimming position and being in contact with the outside of the tree trunk, can supply signals that can be converted into measuring data, representing the diameter of the tree trunk 7. Each trimming knife is sustained by an arm 25, 26, which is pivotably located about a shaft 27, 28. A hydraulic cylinder 30, 31 is arranged to swing the arm about said shaft and thereby cause the trimming knives 8, 8' to get into contact and engagement with the outside of the tree trunk 7. The first measuring device can thereby comprise a sensor 50:1, 50:2, which registers the swing of the arm 25, 26 about said shaft 27, 28, suitably from a pre-determined initial position to the position, in which it engages with the tree trunk 7. Based on the registered swing of said sensor 50:1, 50:2 and the pre-determined correlation between it and the diameter of the tree trunk 7, the control unit 7 is arranged to calculate the diameter of the tree trunk 7.

The second measuring device comprises the example illustrated in FIG. 4 of a pressure sensor 50:3, 50:4 that measures the pressure of the hydraulic fluid that drives the hydraulic cylinder 30, 31, which are provided to swing the arm 25, 26 about said shaft. A target value interval can be determined for the hydraulic fluid, within which the target value β of the hydraulic fluid pressure should be when the trimming knives 9, 9' engage with the tree trunk 7. The control unit 11 is suitably arranged to manage deviation between the measured actual value α of the hydraulic pressure and the indicated target value β in the same manner as described above, where the first measuring device comprises the length measuring wheel 6.

As mentioned above, the third measuring device is a measuring device of the type that is independent of the first and the second measuring devices. The third measuring device can typically comprise manually operable measuring elements of a trivial type, for instance a so-called key for measuring the diameter of the tree trunk and a conventional tape measure for length measuring of a tree trunk 7. Measurement with the third measuring device is typically initiated by the control unit 11 detecting that the actual value $\alpha$ deviates from the target value $\beta$ by more than a pre-determined difference x and thereby activates an alarm, advising the operator that this is the case. Measurement with the third measuring device is performed thereby, whereupon data from this measurement is saved together with corresponding measurements with the first and second measuring devices on a computer-readable storage medium, which is either held in the control unit 11 or to which the control unit has access and which step is illustrated by block S9 in FIG. 6. The measuring result from the first measuring device is compared with the measuring result from the third measuring device, and suitably, the control unit 11 is arranged to carry out this comparison in a suitable diagnostic model in a computer program. If the difference between these measuring results exceeds a certain limit (see block S6), a calibration of the first measuring device takes place with respect to the result of the measurement with the third measuring device, which is shown in block S7. The control unit 11 suitably is arranged to carry out this calibration, which is illustrated in FIG. 2.

Over time, the computer-readable storage medium 10 will contain extensive difference data x, y, which enables identification of a correlation between particularly the deviation between the actual values $\alpha$ and the target values $\beta$ and the difference between the measurements with the first measuring device and the third measuring device, denoted Y. This correlation should be evaluated and can, provided that it is deemed to be sufficiently reliable, form the basis for the control unit 11 executing an automatic calibration of the first measuring device entirely based on the comparison of the actual value $\alpha$ and the target value $\beta$ of the second measuring device, i.e. without resorting to measurement with the third measuring device.

FIG. 6 shows a flow chart of the method according to the invention. In a first step S1, measurement of a dimension (length or diameter) is carried out on a tree trunk 7 with the first measuring device. A measure of the dimension, dim.(1), is thereby obtained. In a subsequent step S2, measurement of a feature of the first measuring device is carried out by means of a second measuring device, whereby said feature is an attribute (data), reflecting the capability of the first measuring device to measure said dimension correctly. The feature can, as described above, for instance comprise a pressure of a hydraulic fluid, which drives a moveable component of the first measuring device. A time-wise reverse order of these measurements S1 and S2 is possible, and they are carried out simultaneously. Measurement of said feature results in the establishment of an actual value $\alpha$ for said feature. In a subsequent step S3, a comparison is made between the actual value $\alpha$ and a target value $\beta$ for said feature, whereby the target value is indicative of a state of the first measuring device, in which its measurement of said dimension is considered to be correct. If the absolute amount of the difference between $\alpha$ and $\beta$ is below a limit value x, no further action is taken, S4. However, if the actual value $\alpha$ deviates from the target value $\beta$ by more than a pre-determined difference x (absolute value) a check measurement is performed in the next step S5 of the dimension with a third measuring device, whereby a measured dim.(3) is obtained. In the next step S6, dim.(1) is compared with dim.(3), and if an absolute measurement value of the difference exceeds a certain limit value Y, a calibration S8 of the first measuring device is performed so that the difference between dim.(1) and dim.(3) in a renewed measurement with the first measuring device should be lower than the limit value Y, preferably so that dim.(1)–dim.(3) is zero. However, if the difference between dim.(1) and dim.(3), despite the registered difference between the actual value $\alpha$ and the target value $\beta$ exceeding x, undershoots the limit value Y, and the first measuring device thereby is considered to measure correctly, a calibration of the second measuring device can possibly be made in a separate step S7. For example, the target value $\beta$ can be changed or the limit value x can be changed.

Finally, dim.(1), dim.(2), $\alpha$ and $\beta$ for the performed measurements are saved in the computer-readable storage medium, step S9.

FIG. 7 shows an alternative exemplary embodiment, according to which steps S10-S14 are identical with steps S1-S4 described above. When in step S14, it has been established that the actual value $\alpha$ deviates from the target value $\beta$ by more than a pre-determined difference x (absolute value), a correlation is calculated in the following step S15 between $\alpha-\beta$ and dim.(1)–dim.(3) based on previously registered measurements of these at previous measurements, which are collected in the computer-readable storage medium, here designated database. Thus, the correlation offers an idea of the extent of the measuring error (dim.(1)–dim.(3)) for the first measuring device based on the size of $\alpha-\beta$. In a subsequent step S16, a calibration is carried out by the first measuring device based on the calculated correlation. Thereby a calibration of the first measuring device is carried out based on statistics from previous measurements and not by a control measuring with the third measuring device. It is within the framework of the present invention to combine the method shown in FIG. 6 with the method shown in FIG. 7. For instance, these methods can be applied alternately according to a given sequence where the method according to FIG. 6 is used to ensure that there are sufficient reliable data for the method according to FIG. 7 to be applied.

The invention claimed is:

1. A method for measuring at least one dimension of a tree trunk by a first measuring device arranged in connection with a harvester aggregate, wherein the method comprises the following steps:

measurement of said dimension by the first measuring device, whereby the method comprises the following steps measurement of a feature of the first measuring device by a second measuring device, whereby said feature is an attribute, reflecting the capability of the first measuring device to measure said dimension correctly, or whether calibration of the first measuring device should be performed, comparison between an actual value for the measured feature and a target value for said feature, whereby the target value is indicative of a state of the first measuring device, wherein the measurement of said dimension of the first measuring device is considered to be correct and, in response to the actual value deviating from the target value by more than a pre-determined difference, at least one of the following actions:

check measurement of said dimension with a third measuring device and calibration of the first measuring device based on the deviation between a measurement value of said dimension measured with the first measuring device and a measurement value of said dimension measured with the third measuring device, calibration of the first measuring device based on a size of the deviation between the measured actual value and said target value.

2. The method according to claim 1, wherein measurement of said dimension with the first measuring device includes measuring the dimension with at least one of the following components:

a pair of feed rolls, to guide the tree trunk through the harvester aggregate, a length measuring wheel, arranged to bear against the tree trunk and caused to roll when the tree trunk is fed through the harvester aggregate, a pair of trimming knives to trim the tree trunk, while the tree trunk moves through the harvester aggregate.

3. The method according to claim 2, wherein the component with which said dimension is measured is a component that, through the effect of hydraulic fluid, is caused to swing about a shaft in connection with the component being in engagement with or is caused to engage with or interact with the tree trunk in such a manner that the swing can be translated to said dimension, whereby a pivotal movement is measured with the first device and the feature in the form of an attribute that is measured with the second measuring device is a pressure of the hydraulic fluid that drives said pivotal movement of the component.

4. The method according to claim 1, wherein the actual value deviating from the target value by more than a pre-determined difference, comprises check measurement of said dimension with a third measuring device and that the deviation between the actual value and the target value is compared with the deviation between a measurement value of said dimension obtained with the first measuring device and a measuring value of said dimension obtained with the third measuring device, and that the comparison is saved in a working memory in a control unit.

5. The method according to claim 1, wherein the dimension that is measured with the first measuring device is the length of the tree trunk and that length measurement is performed by registering the rotation of a feed roll to guide a tree trunk through the harvester aggregate, and that the feature, which is measured at the first measuring device with the second measuring device is an attribute in the form of a pressure of a hydraulic fluid that drives a hydraulic cylinder with which the position of the feed roll is controlled.

6. The method according to claim 1, wherein the dimension that is measured with the first measuring device is the length of the tree trunk and that the measurement of the tree trunk length is performed by registering the rotation of a length measuring wheel, arranged to bear against and be caused to roll, when the tree trunk is guided through the harvester aggregate, and that the feature, which is measured at the first measuring device with the second measuring device is an attribute in the form of a pressure of a hydraulic fluid that drives a hydraulic cylinder with which the position of the measuring wheel is controlled.

7. The method according to claim 1, wherein the dimension that is measured with the first measuring device is the diameter of the tree trunk and that the measurement of this diameter is performed with at least one of the following components, a pair of feed rolls to guide the tree trunk through the harvester aggregate or a pair of trimming knives to trim the tree trunk, while the tree trunk moves through the harvester aggregate, whereby the method comprises pivotal movement about a shaft for said respective arm, which pivotally movably sustains said feed rolls or trimming knives on the harvester aggregate are registered and that the feature, which is measured at the first measuring device with the second measuring device is an attribute in the form of a pressure of a hydraulic fluid that drives a hydraulic cylinder with which said respective arms swing about said respective shaft is controlled.

8. A computer program for controlling a device, comprising instructions which, when they are executed in a processor, cause said processor to carry out the method according to claim 1.

9. The computer-readable storage medium, which includes a computer program for controlling a device according to claim 8.

10. A harvester, comprising a harvester aggregate for felling, trimming and preparation of tree trunks, a first measuring device comprising a sensor, arranged in connection with the harvester aggregate for measuring at least one dimension of a tree trunk whereby the harvester further comprises a second measuring device comprising a sensor, for measuring a feature of the first measuring device, whereby said feature is an attribute, reflecting the capability of the first measuring device to measure said dimension correctly or whether calibration of first measuring device should be performed, a control unit configured to make a comparison between an actual value on the feature measured as the attribute and a target value of said feature, whereby the target value is indicative of a state of the first measuring device, wherein the measurement of said dimension of the first measuring device is considered to be correct and a third measuring device comprising a manually operable measuring element, for checking the measurement and the calibration of the first measuring device based on the deviation between a measurement value of said dimension measured with the first measuring device and a measurement value of said dimension measured with the third measuring device.

11. The harvester according to claim 10, wherein the harvester aggregate comprises at least one of the following components:

a pair of feed rolls, to guide the tree trunk through the harvester aggregate, a length measuring wheel, arranged to bear against the tree trunk and be caused to roll when the tree trunk is fed through the harvester aggregate, a pair of trimming knives for trimming the tree trunk, while the tree trunk moves through the harvester aggregate, and at least one of these components forms part of the first measuring device.

12. The harvester according to claim 11, wherein the component with which said dimension is measured is a component that, through the effect of hydraulic fluid, is caused to rotate about a shaft in connection with the component being in engagement with or is caused to engage with or interact with the tree trunk, whereby the sensor of the first measuring device measures the component's rotation about said shaft and the sensor of the second measuring device measures a pressure of the hydraulic fluid that drives said pivotal movement of the component.

13. The harvester according to claim 11, wherein the first measuring device comprises said feed rolls and registers the rotation of the feed rolls while a tree trunk is guided through the harvester aggregate and calculates the tree trunk length based on the registered rotation and that the feature, which is measured by the first measuring device with the second measuring device is an attribute in the form of pressure of a hydraulic fluid in the hydraulic cylinder, which is arranged to apply a pressure force on the feed rolls against a tree trunk that is guided through the harvester aggregate and that the second measuring device comprises a pressure sensor for measuring said pressure.

14. The harvester according to claim 10, further comprising a length measuring wheel, arranged to bear against a tree trunk and be caused to roll when the tree trunk is guided through the harvester aggregate, that the first measuring device comprises said measuring wheel, registers the rotation of the measuring wheel and calculates the tree trunk length based on the registered rotation and that the feature, which is measured at the first measuring device with the second measuring device is an attribute in the form of a pressure of a hydraulic fluid in the hydraulic cylinder, which is arranged to apply a pressure force on the measuring wheel against a tree trunk that is guided through the harvester aggregate and that the second measuring device comprises a pressure sensor for measuring said pressure.

15. The harvester according to claim 11, wherein the trimming knives form part of the first measuring device and are pivotably arranged about a respective shaft to swing in the direction to and from the interaction with a tree trunk guided through the harvester aggregate, that the first measuring device registers the trimming knives' swing about said shaft, calculates the tree trunk diameter based on the registered swing and that the feature that is measured at the first measuring device with the second measuring device is an attribute in the form of a pressure of a hydraulic fluid in a hydraulic cylinder, which is arranged to swing the respective trimming knife about said shaft, and that the second measuring device comprises a pressure sensor for measuring said pressure.

16. The harvester according to claim 10, wherein each of said first and second measuring devices comprises electronically effective units, wherein each such unit is integrated in the harvester aggregate and is capable of, via an interface with data flow in electronic buses, communicating with a control computer constituent in the harvester.

* * * * *